United States Patent [19]

Newmayer

[11] Patent Number: 4,684,167
[45] Date of Patent: Aug. 4, 1987

[54] ROOF HINGED DOOR APPARATUS

[76] Inventor: Ricky L. Newmayer, 14906 So. Figueroa, Gardena, Calif. 90248

[21] Appl. No.: 911,723

[22] Filed: Sep. 26, 1986

[51] Int. Cl.$^4$ ............................ B60J 5/04; E05D 7/00
[52] U.S. Cl. .................................. 296/202; 296/146;
296/37.13; 49/398; 49/399; 16/382; 16/223;
292/DIG. 23
[58] Field of Search .................. 296/56, 106, 146, 202,
296/37.13; 49/398, 399, 36, 40; 16/379, 382,
223, 251; 292/DIG. 23

[56] References Cited
U.S. PATENT DOCUMENTS
1,622,598  3/1927  Marshall .............................. 16/382

FOREIGN PATENT DOCUMENTS
854148  4/1940  France .................................... 49/36
1270666  7/1961  France .................................. 296/146

Primary Examiner—Robert B. Reeves
Assistant Examiner—Dennis H. Pedder
Attorney, Agent, or Firm—Roger A. Marrs

[57] ABSTRACT

An automobile body is disclosed herein having a roof hinged door operable between a raised open position and a lowered closed position wherein the hinge is a unitary construction having a well with arcuate side portions mating with a seal secured in the roof door jamb so as to be conformed with the outline of the automobile body configuration and further includes foldable, telescoping articulated support struts as well as lock mechanisms for releasably securing the door in its closed position.

15 Claims, 13 Drawing Figures

ROOF HINGED DOOR APPARATUS

BACKGROUND OF THE INVENTION

1. Field of the Invention

The present invention relates to automotive vehicles, particularly of the passenger type, and to such a vehicle which includes laterally opening doors that are swingable or pivotal in an upward direction about a pivot axis established at the roof door jamb of the vehicle.

2. Brief Description of the Prior Art

In the past, it has been the conventional practice to provide ingress and egress to and from a vehicle by opening doors which are hingeable at the sides of the door jambs. The vast majority of automotive vehicles incorporate such a door hinge system. However, in other instances, it has been found desirable to mount access doors to the body of the vehicle by hinging the doors along the roofline of the door jamb.

Several attempts to provide such an upward swinging door for an automotive vehicle are known in the prior art such as those disclosed in U.S. Pat. No. 3,511,530 or U.S. Pat. No. 4,017,117. Although such doors have been useful for their intended purpose, several deficiencies and problems have been encountered which stem largely from the fact that the hinge supports are incorporated directly into the body structure which is a time-consuming and expensive proposition. The various supports and plates of the assembly are individually joined to the roof door jamb and no attempt is made to unitize or produce an assembly which may be readily incorporated into a door jamb in order to successfully support a swingable door. Such unitization is particularly important when it is desired to retrofit existing vehicles with upwardly swingable doors after the side swinging doors have been removed. The problems of converting an existing car body to such an upward swingable door arrangement must also include conformable fitting of the door so as to mate with the overall or general configuration of the body style. Furthermore, means must be incorporated which will releasably support the door in its upward or open position and other means must be provided for releasably locking the door in a closed position. All such elements of a successful upwardly swinging door combination must be unitized in a standard assembly so that installation can be provided in an economical and speedy manner.

Therefore, it is among the primary objects of the present invention to provide a novel upwardly swinging door arrangement for automobiles which will readily permit ingress and egress of occupants wherein the door may readily swing upwardly along a roof hinge line and wherein the hinge supports are unitized for ready installation. Door support and locking means are provided which augment the hinge arrangement so that the door may be releasably held in a closed or open position. Water draining means should be incorporated into the hinge assembly as well as adequate sealing about the periphery of the door when the door is closed.

SUMMARY OF THE INVENTION

Accordingly, the above problems and difficulties are obviated by the present invention which provides a novel upwardly swinging door which incorporates a pair of hinge assemblies readily mountable in the roof door jamb of an automobile body construction. Each of the hinge assemblies includes a mounting well which includes a support plate for mounting one half of the hinge per se. The other half of the hinge is coupled to the body of the automobile and drainage means are provided from the mounting well exteriorly of the assembly via drain tubes trained along the inside of the door jamb.

Means are also provided for supporting the door in the raised position which may include at least a pair of telescoping struts which are arranged to articulate in a pivotal fashion by employing universal joints at the opposite ends of each strut connected to the door and the auto body respectively. Means are also provided for releasably locking the swingable door in its closed position which includes both automatic and manual release.

Therefore, it is among the primary objects of the present invention to provide a novel upwardly swinging door for an automobile which employs unitized hinges for mounting the door to the vehicle door jamb whereby economies in cost and time are experienced in changing an existing door-closing system from a side swinging door to the upwardly swingable door.

Another object of the present invention is to provide a novel means for mounting an upward swingable door to a car body which incorporates a unitary hinge assembly that may be readily mounted into the door jamb of an existing auto body.

Another object of the present invention is to provide a novel strut supporting system for an upward swingable door which may be readily articulated by employment of universal joints at the opposite ends of elongated, telescoping struts so that the struts are reasonably hidden from view when the door is closed and are out of the way of persons entering or leaving the car when the door is open.

Still another object of the present invention is to provide an economic means for converting existing side swinging doors on an automobile to an upwardly swinging door arrangement by the use of a unitized door hinge that may be readily installed into an existing door frame.

Still a further object of the present invention is to provide an upwardly swinging door which incorporates an articulated strut system for holding the door in an upward position, and which includes a selectively releasable lock means for securing the door in a downward closed position.

Another object of the present invention is to provide a unitized hinge arrangement for mounting a door to an automobile jamb permitting upward swinging or raising of the door which includes drainage means for conducting collected water exteriorly of the door jamb and body of the automobile.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
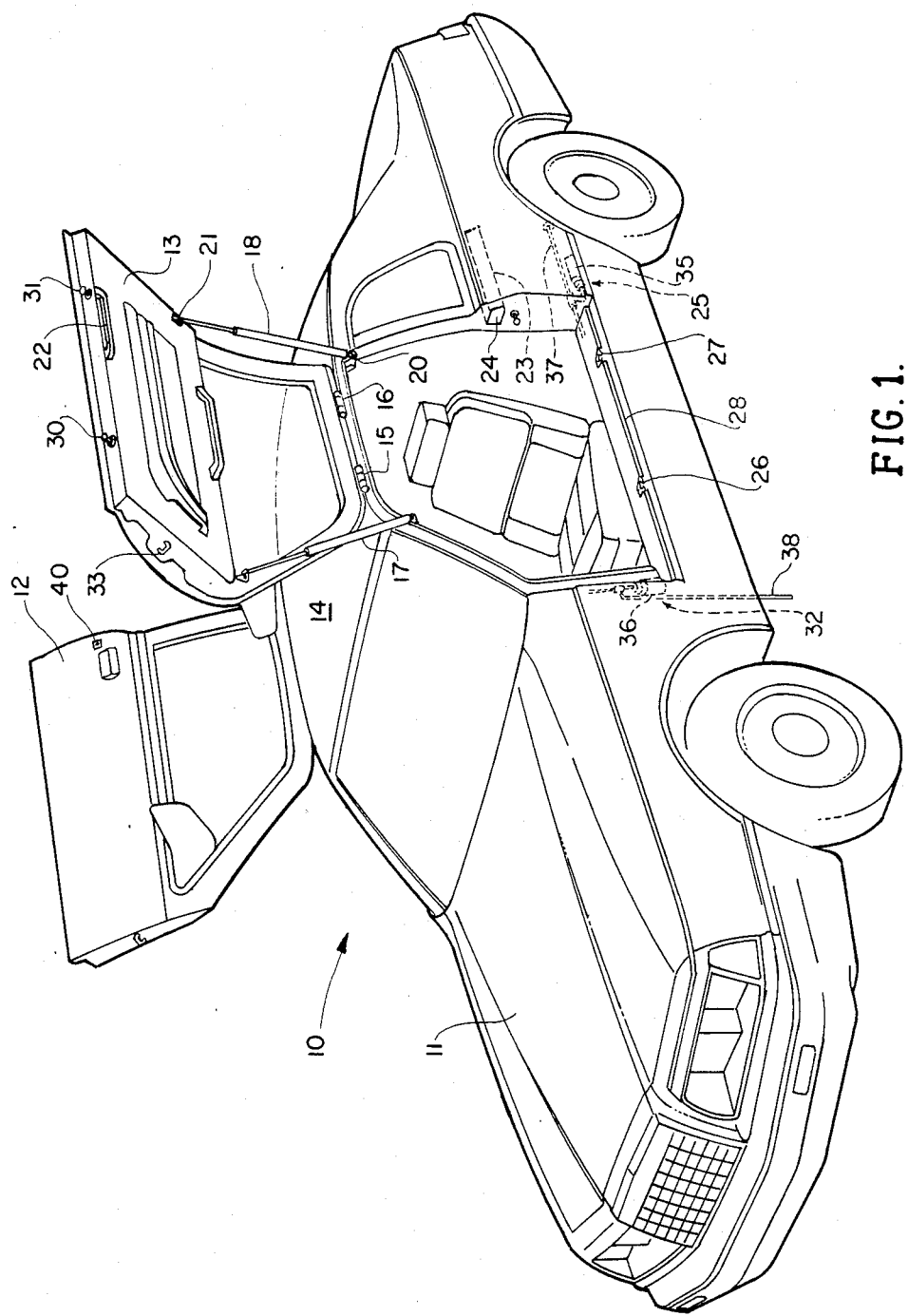
FIG. 1 is a front perspective view of a passenger automobile incorporating upwardly swinging doors employing the unitized hinge assemblies of the present invention and further illustrating the articulated struts and door locking means.

Referring to FIG. 1, a passenger automobile is illustrated in the general direction of arrow 10 which incorporates the swingable doors of the present invention. The body 11 of the automobile 10 is of a conventional design in which the standard doors have been removed or modified to incorporate the present invention. Therefore, the invention is particularly useful in converting the standard access doors from a side swinging type to an upward swinging type. Body 11 includes upwardly swinging doors 12 and 13 which swing about the hinge axis along the roofline of the roof 14 of the body 11. The laterally swinging door 13 includes unitized hinges 15 and 16 pivotally mounting the top of the door to the roof jamb of the body and telescoping struts 17 and 18 support the door 13 in its upward position so that a clear opening is provided into the interior of the vehicle for passenger or driver ingress and egress. In order to permit raising and lowering of the door in a smooth manner, the supporting struts 17 and 18 are fully articulated so as to not only vary the length of each strut during the opening or closing procedure but the opposite ends of each strut are connected by universal joints such as indicated by numerals 20 and 21 to the body door jamb and the door 13 respectively. On incorporating fully articulated support struts, the struts may be positioned to a convenient at rest position when the door is open so as not to interfere with passenger ingress or egress through the opening into the body 11. Also, when the door is in its closed position, the articulated support struts are arranged to be visibly covered or conformal with the general outline of the door jamb so as not to obscure passenger or driver viewing through the window. A handle 22 is carried along the inside bottom edge of the door 13 which may be utilized by a person moving the door to either its open position or closed position.

It is to be particularly noted that when the door is in the raised position, access is had to a storage compartment indicated by numeral 23. The storage compartment is integrally built into the body of the vehicle with a door 24 adapted to be opened or closed to permit access to the interior of the compartment. Preferably, the compartment is substantially elongated so as to house awkward items such as umbrellas, canes or the like.

It is also to be noted that the vehicle 10 includes automatic door locks for securing the door in the closed position which incorporates a locking mechanism indicated in general by numeral 25. The locking mechanism includes exposed latches 26 and 27 in one embodiment of the invention that are arranged along a door sill 28 and are adapted to receive extension lock pins 30 and 31 respectively which are downwardly protruding from the lower part of the door 13. In another embodiment of the invention, the door securement or locking mechanism can be included in the side door jamb and such a different embodiment is indicated by numeral 32. In this instance, the mechanism 32 includes a latch of U-shaped configuration or of a pin or stud configuration that is outwardly projecting from the side of the door 13 as represented by numeral 33. The mechanism for operating the door latches in either embodiment 25 or 32 is substantially hidden in the body structure of the vehicle and the only exposure is through openings exposing a portion of the latch intended to mate and lock with the pins 30-31 or pin 33. A feature of the lock mechanism includes automatic locking via an electrical circuit incorporating solenoids 35 in connection with embodiment 25 and solenoid 36 in connection with embodiment 32. Manual releases for both embodiments are also incorporated into the structure and take the form of a lanyard or cord that is pulled by hand in order to release the latches from the respective pins. In the one embodiment 25, the lanyard extends rearwardly to terminate exteriorly of the car body in the rear wheel well and the cord is illustrated in general by numeral 37. For the lock mechanism 32, the cord or lanyard is indicated by numeral 38 and extends downwardly beneath the body 11 so that it may be readily grasped by the vehicle operator prior to opening of the door 13. Actuation of either solenoid 35 or 36 may be achieved by a T-lock mechanism incorporated into a key cylinder 40 as shown with respect to door 12.

Although a particular body style is illustrated in FIG. 1, it is to be understood that the present invention incorporating laterally swinging doors may be used in other configurations and that the invention is not limited to a particular style. Through the use of unitized hinge assemblies 15 and 16, a variety of body styles may use the laterally swinging doors 12 and 13. In any particular style, the doors will conform to the overall styling and conformity to configuration of the particular style or design. In actual practice, the doors of a particular automobile design are initially removed and the lower portion of the door shortened and finished with a panel having the downwardly extending studs 30 and 31 for the one lock mechanism configuration or the side projecting stud 33 for the other lock mechanism configuration. Next, the lower portion of the door opening is built or extended to include a raised sill 28 that provides greater depth to the interior of the vehicle as the user steps in and out of the opening created by the raising of the door. In the lock mechanism 25, the actuating rod or shaft connected to the solenoid 35 is covered by the sill 28 as well as the operable latches 26 and 27.

Figure 2:
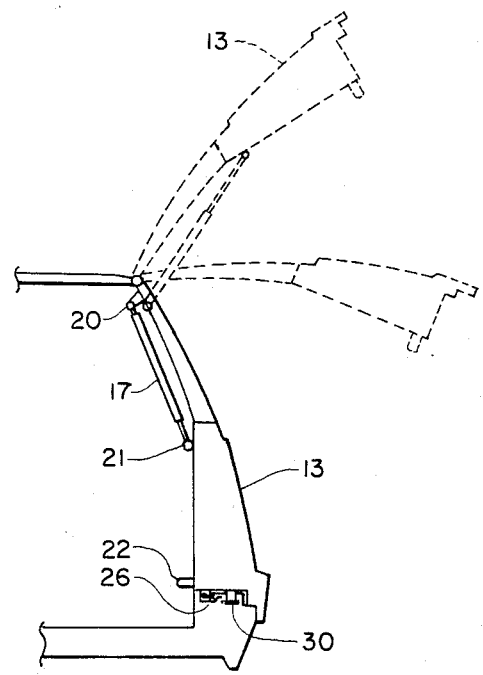
FIG. 2 is a diagramatic view in transverse cross section of the swingable door shown in FIG. 1 illustrating the door in solid lines as closed and in broken lines as open.

Referring now in detail to FIG. 2, it can be seen that the door is illustrated in its closed position in solid lines and in its open position in broken lines. When in its closed position, the pin 30 is in engagement with the latch mechanism 26 so that the door is secured. When released, the door may be raised to its open position and supported in that position by the support struts 17 and 18. The raised door is shown in an intermittent position between the closed and full open position. This is transitory and the door is not held in this position by any mechanism. In the full open position, as shown in broken lines, the door is fully elevated and the bottom of the door is raised sufficiently so as not to interfere with passage of an occupant in and out of the vehicle.

Figure 3:
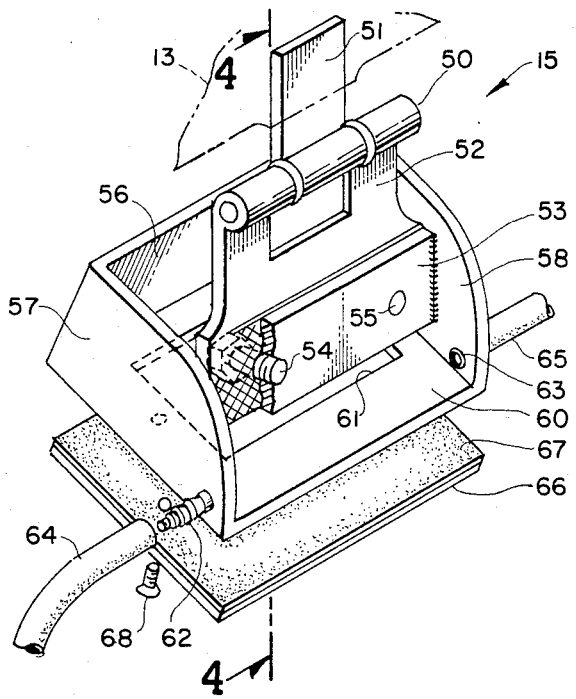
FIG. 3 is a perspective view, enlarged, of a unitized hinge assembly incorporating the present invention.

Referring now in detail to FIG. 3, the novel hinge assembly of the present invention is illustrated in the general direction of arrow 15 and includes a hinge 50 having a hinge portion 51 which is attached to the door 13 by a variety of means such as welding, screws, bolts or the like. The other half or hinge plate of the hinge 50 is indicated by numeral 52 and is bolted to a support plate 53 by means of bolts 54 and 55 respectively. The support plate 53 is welded at its opposite ends to the opposing inside surfaces of a hinge well 56. The well 56 includes a back plate, a bottom plate and a pair of side plates such as indicated by numerals 57 and 58 which, including the support plate 53, define a unitary construction for supporting the hinge plates 51 and 52 of the hinge 50. It is to be particularly noted that the support plate 53 is angled with respect to the bottom of the well as indicated by numeral 60 so that a proper hinge pivot or rotation axis angle can be accommodated for proper alignment of the door with respect to the sides of the vehicle and the roof of the vehicle. Also, a feature of the hinge assembly resides in the provision of an inspection or maintenance opening indicated by numeral 61 which is in the bottom plate 60 whereby convenient access to the heads of the bolts 54 and 55 can be had. In order to maintain a proper securement between the opposing faces of the hinge plate 52 and the surface of the support plate 53, the respective surfaces of the plates are knurled or scored to prevent inadvertent slippage or movement. A further feature of the hinge assembly resides in the provision of a drainage system comprising outlets 62 and 63 that are carried on the side plates 57 and 58 of the assembly adjacent to the bottom plate 60 so that any fluid such as rainwater or the like caught by the well 56 may be conducted exteriorly of the vehicle via drainage tubes 64 and 65. The drainage tubes may be suitably trained along the door jamb of the body 11 and may exhaust or empty through the bottom of the vehicle. A closure plate 66 is coupled to the exposed bottom plate 60 of the assembly in order to cover the inspection hole 61. A gasket 67 is used to seal the opening and screws, such as screw 68, are employed for detachably connecting the plate 66 to the external surface of the well bottom plate 60. Therefore, it can be seen that the hinge well assembly 15 may be readily produced as an integral assembly which is then installed in the upper door jamb of the vehicle body. The hinge assembly may either be attached to the door prior to attachment to the roof or the hinge assembly may be attached to the roof followed by mounting of the door onto its respective hinge plate. The important feature to remember is the fact that the hinge assembly may be readily incorporated into an existing car body so that the body may be retrofitted with lateral swinging doors.

Figure 4:
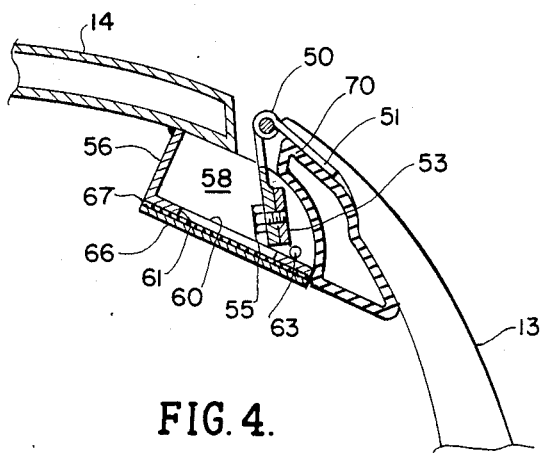
FIG. 4 is a transverse cross-sectional view of the hinge assembly shown in FIG. 3 as taken in the direction of arrows 4—4 thereof.

Referring now in detail to FIG. 4, it can be seen that the hinge plate 51 directly connects to the roof 14 and that the well 56 downwardly suspends from the roof structure. The plate 66 may be readily removed when it is desired to have access to the bolts 54 or 55 or to inspect the interior of the well. A collapsible seal 70 bears against the hinge 50 and along the arcuate peripheral edge of the well 56 when the door is in its closed position. Preferably, the seal 70 may be either carried along the exposed surface of the side plates 57 and 58 or the seal 70 may be carried on the inside of the upper door jamb of door 13. It is also to be noted that the well 56 is canted or slanted so that the drainage outlets 62 and 63 are at the lowest part of the well interior.

Figure 5:
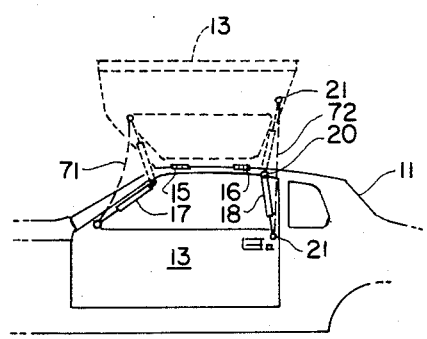
FIG. 5 is a diagramatic view of the vehicle shown in FIG. 1 illustrating the articulated support strut system.

Referring now in detail to FIG. 5, it can be seen that the support struts 17 and 18 are fully articulated so as to not only vary their overall length during the raising or lowering of the door between its open and closed position but the swing of the ram end of the strut with respect to the chassis or body 11 follows an irregular curve 71 with respect to strut 17 and a more linear line of travel as indicated by numeral 72 with respect to strut 18. The variable extension and contraction of the overall length of the struts during the positioning of the door 13 is achieved by using universal joints 20 and 21 to mount the respective struts against the upper door jamb and the door at a position midway between its opposite ends. The midway position is roughly adjacent to the window sill of the door window. It is to be particularly noted that when the door is closed, as shown in solid lines in FIG. 5, the front strut 17 lies immediately adjacent to the forward door jamb so as to blend or conform with the overall design and appearance of the vehicle. To this extent, it may be said to be hidden from view since the strut is substantially tucked into the door jamb and is partially covered by the normal door seals. The rear strut 18 is similarly tucked into the door jamb so as to be substantially obscured by the conventional door seal. The nonlinear travel indicated by numeral 71 of the forward strut not only permits the extending and shortening of the strut itself but maintains the strut out of the central opening through which the occupants of the vehicle must pass. Similarly, the rear strut 18 follows a more linear line of travel so that it is kept out of the way of passengers moving in and out of the vehicle.

Referring now in detail to FIGS. 6-9 inclusive, an automatic door lock and release system is illustrated for securing the door 13 in its closed position. In the FIG. 6, it can be seen that a solenoid 35 includes a rod 80 which moves back and forth as the solenoid is energized and de-energized. The rod 80 connects to an operative rod 81 extending along the length of bottom door sill 28 within a trough 82. The operative rod 81 serves as a push-pull rod in response to the energization and de-energization of the solenoid 35 and the operative rod 81 is connected to a conventional jaw latch mechanism 26 and 27 via an operative link 83 and 84 respectively.

Figure 7:
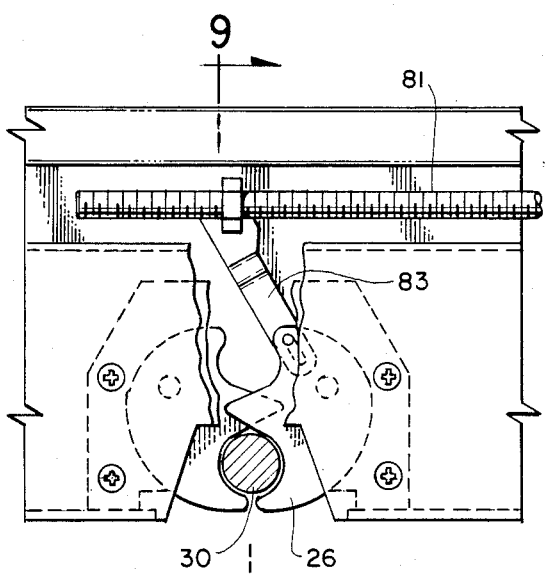
FIGS. 6 and 7 are enlarged top views of the lock means for securing the door in its down position illustrated in the locked and unlocked positions respectively.
Figure 8:
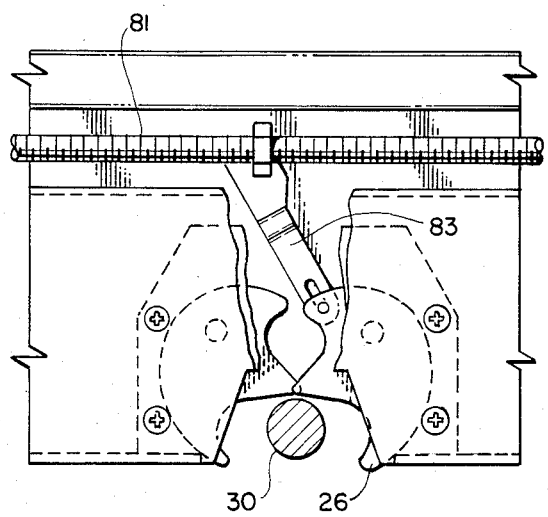
FIG. 8 is a transverse cross-sectional view of the lock mechanism in its locked position as taken in the direction of arrows 8—8 of FIG. 6.
Figure 9:
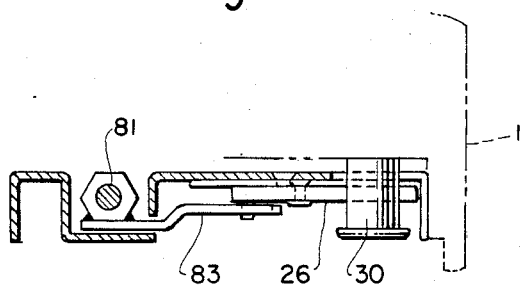
FIG. 9 is a perspective view of the lock system incorporated in the vehicle of FIG. 1.
Figure 6:
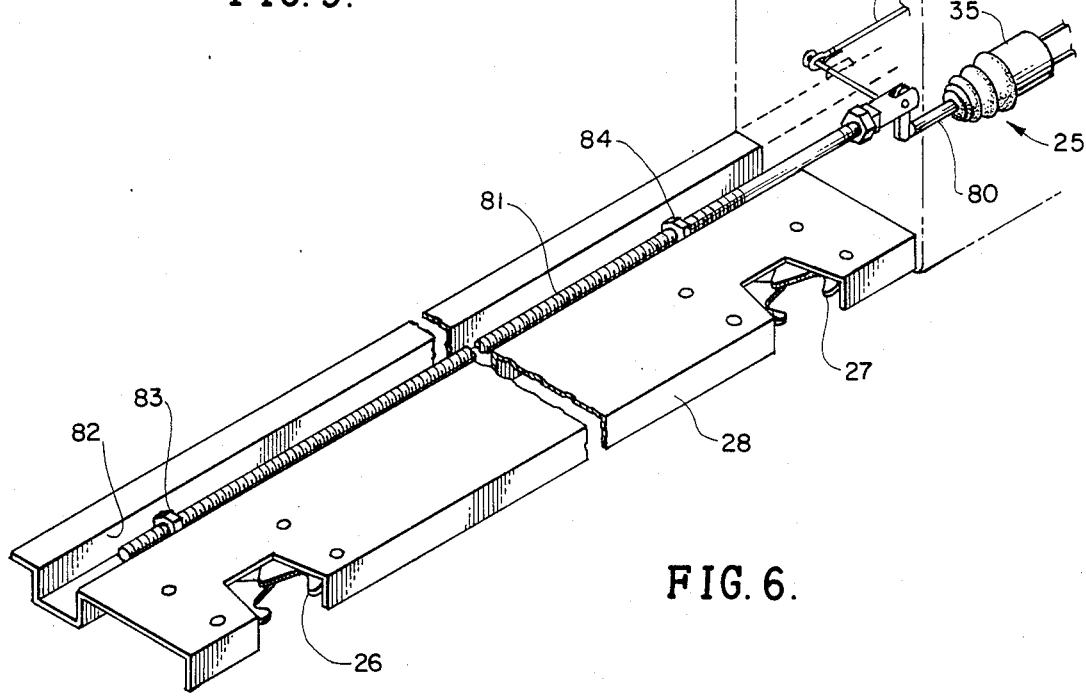

In FIG. 7, it can be seen that the latch jaws 26 are in their closed position about door pin 30. However, when the solenoid is operated in an opposite direction to move the operating rod 81 accordingly, the jaws 26 open to release the door pin 30. The details of the latch mechanism are conventional and do not form a part of the present invention. Any latch mechanism is suitable for use with the present invention as long as an operating link 83 will move or actuate the locking latch members. Furthermore, FIG. 9 also shows the door pin 30 as being latched by the jaws of the latch mechanism 26.

Figure 10:
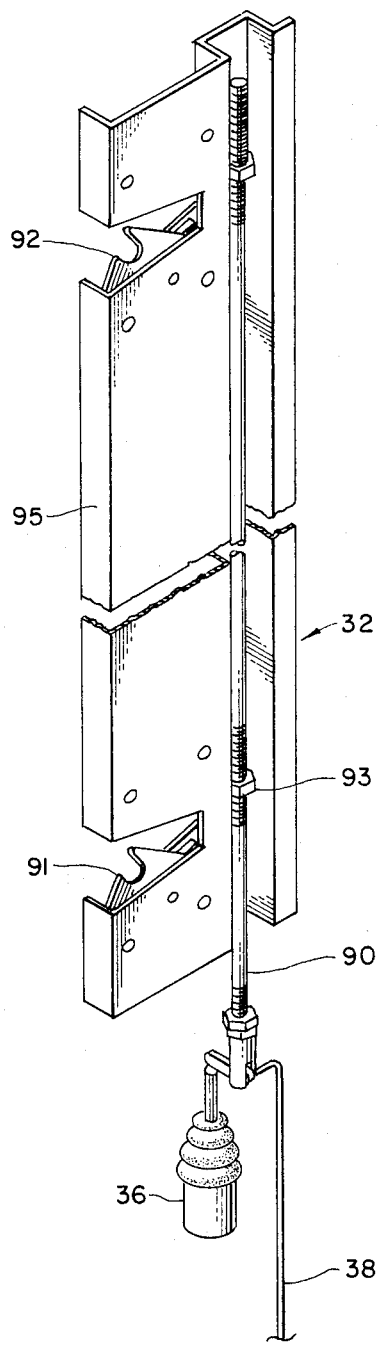
FIGS. 10-12 inclusive are views of an alternate locking system used to secure the door in a closed position suitable for installation in the side door jamb of the vehicle.
Figure 11:
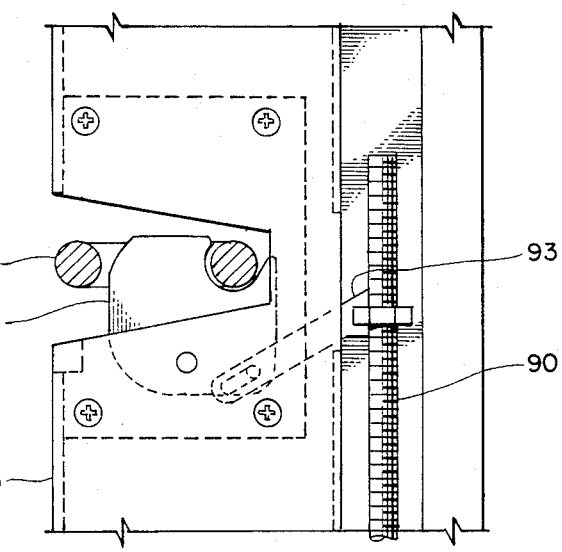
Figure 12:
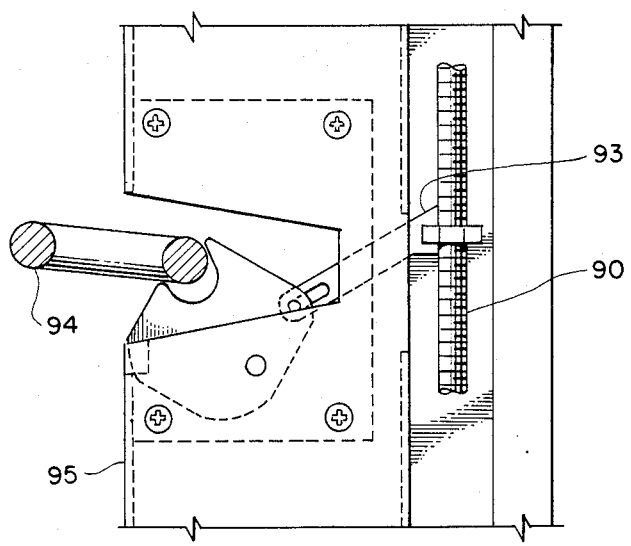

Referring now in detail to FIGS. 10 through 12 inclusive, another embodiment for a latch mechanism is illustrated which may be mounted on the side door jamb of the car body and operated with a stud or eyelet carried on the side of the door. The embodiment is indicated in the general direction of arrow 32 and is similar to the embodiment shown in FIG. 6. The solenoid 38 operates an elongated operating rod 90 that is connected to a pair of latch jaws 91 and 92 by means of a link such as link 93 associated with jaw 91. As the solenoid 38 is energized and de-energized, the latches 91 and 92 operate to engage or disengage with a stud or an eyelet 94 shown in FIGS. 11 and 12. For a manual release, lanyard or cord 38 is pulled to move the operating rod. The latch mechanisms 91 and 92 are illustrated as being mounted within the side door jamb and numeral 94 indicates such structure. Openings are provided adjacent to the jaws to permit insertion of the door latch into and out of the lock mechanism.

In FIG. 11, the eyelet 94 has been inserted through the opening in the side door jamb 94 and the latch jaw 91 has been operated via link 93 so that a portion of the jaw is inserted in the opening of the eyelet to effect closure and locking. Upon reversing of the operating rod 90, either by solenoid operation or by manual operation, the jaw or latch 91 is positioned to the condition shown in FIG. 12 which releases the link or eyelet 94 so that the door may be raised, and which includes a selectively releasable lock means for securing the door in a downward closed position.

Figure 13:
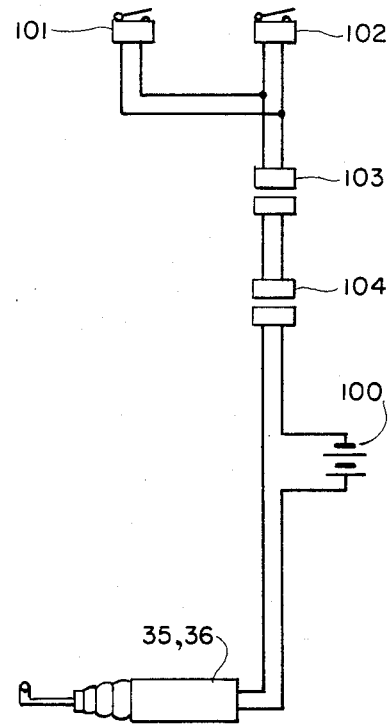
FIG. 13 is an electrical schematic for operating the automatic door latching mechanism.

FIG. 13 illustrates a circuit suitable for operating the solenoid 35 in the embodiment 25 or the solenoid 36 in the latch version of embodiment 32. A battery 100, which is the normal automobile power source, is coupled between the solenoid and an inner door switch 101 and an outer door switch 102. Connectors 103 and 104 are part of the usual cabling running between the components of the system circuit. Upon door actuation of either switch, actuation of the operating rod 81, 90 will follow via energization or de-energization of the solenoid. Thus, locking and unlocking of the door in its closed position will result.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In combination with an automobile having a body with a roof and side openings for accommodating movable doors for allowing ingess and egress of occupants into and out of the automobile interior wherein each of said side openings is defined by a continuous door jamb having opposite side jambs joined by a roof jamb and a bottom sill, the improvement which comprises:
    a laterally swingable door occupying said side opening in a closed position against said bottom sill and disposed to an open position upwardly towards said roof jamb
    a pair of unitized and integral hinge assemblies operably connecting said doors to said roof wherein each of said hinge assemblies comprises:
    an open topped well defined by a pair of arcuate side portions separated by a base plate and a rear plate so that the top and front of said well is open wherein said arcuate side portions are adapted to mate with a seal;
    a support plate secured between said side portions at an angle with respect to said base plate; and
    a hinge disposed in said well between said side portions having a pair of hinge plates joined by a hinge pin wherein one hinge plate is secured to said door and the other hinge plate is secured to said support plate.
2. The invention as defined in claim 1 including:
means supporting said door in its raised open position comprising a pair of articulated struts interconnecting said automobile body with said door.
3. The invention as defined in claim 2 wherein:
said struts are of telescoping, variable length having their opposite ends joined to said automobile body and said door by universal joints respectively.
4. The invention as defined in claim 3 including:
door locking means disposed in said body door jamb and cooperating with door studs carried on the periphery of said door for releasably locking said door in its closed position.
5. The invention as defined in claim 4 wherein:
said locking means includes a solenoid connected to latches by a movable rod and link;
said latches being responsive to lock and unlock with said door studs in response to energization and de-energization of said solenoid.
6. The invention as defined in claim 5 wherein:
said latches are is disposed below said automobile bottom sill.
7. The invention as defined in claim 5 wherein:
said locking means is disposed in at least one of said automobile body side jambs.
8. The invention as defined in claim 5 including:
manual release means operably carried on said automobile body and coupled to said rod and link and adapted to override said automatic locking means.
9. The invention as defined in claim 8 including:
said automobile body having an elongated storage compartment opening through one of said side door jambs.
10. A hinge assembly for use with upwardly swingable automobile doors comprising:
    a well having a bottom plate carrying spaced apart arcuate side portions and a rear plate, said side portions adapted to mate with a seal;
    said plates defining an open hinge cavity at the top and front of said well;
    a support plate secured between said side portions at an angle with respect to said bottom plate; and
    a hinge substantially occupying said well cavity having a pair of hinge plates joined by a hinge pin wherein one hinge plate is secured to said support plate and said other hinge plate extends exteriorly of said well cavity for attachment to the automobile door.
11. The invention as defined in claim 10 wherein:
said well base plate is provided with a central opening so that said securement of said hinge plate and support plate can be inspected and serviced.
12. The invention as defined in claim 11 including:
a cover plate removably attached to said well base plate covering said central opening.
13. The invention as defined in claim 12 including:
attachment means securing said hinge plate to said support plate;
said means comprising a pair of bolts having heads adjacent to said central opening.
14. An automobile body comprising:

a roof section;

a laterally swingable door hinged to said roof section disposed to be opened upwardly towards said roof section;

hinge assemblies pivotally connecting said door to said roof section;

each hinge assembly comprising an integral unit adapted to be directly mounted to said roof section;

each hinge assembly having a pair of hinge plates joined by a hinge pin wherein one plate is secured to said roof section via said hinge assembly and the other hinge plate secured to said door;

said hinge assembly further having an open well mounting one of said hinge plates and extending said other hinge plate exteriorly of said well for securement with said door, said well having arcuate side portions adapted to mate with a seal.

15. The invention as defined in claim 14 including:

means incorporated into said well for inspection of said hinge plates and hinge pin.

* * * * *